(12) United States Patent
Gayoso

(10) Patent No.: US 6,725,896 B1
(45) Date of Patent: Apr. 27, 2004

(54) PRINT MEDIA COATING DEVICE WITH BYPASS MEDIA PATH

(75) Inventor: Maximo Gayoso, Guadalajara Jalisco (MX)

(73) Assignee: Hewlett-Packard Company, LP., Houston, TX (US)

( * ) Notice: Subject to any disclaimer, the term of this patent is extended or adjusted under 35 U.S.C. 154(b) by 0 days.

(21) Appl. No.: 10/280,460

(22) Filed: Oct. 25, 2002

(51) Int. Cl.⁷ .............................................. B32B 31/00
(52) U.S. Cl. ...................................... 156/555; 156/582
(58) Field of Search ................................ 156/230, 234, 156/238, 278, 555, 580, 582, 583.1

(56) References Cited

U.S. PATENT DOCUMENTS

| | | | |
|---|---|---|---|
| 4,287,285 A | * 9/1981 | Mosehauer | 430/124 |
| 4,464,220 A | * 8/1984 | Beer | 156/273.3 |
| 4,738,555 A | 4/1988 | Nagashima | 400/240 |
| 5,126,797 A | * 6/1992 | Forest et al. | 399/342 |
| 5,155,536 A | * 10/1992 | Johnson et al. | 399/329 |
| 5,370,960 A | 12/1994 | Cahill et al. | 430/124 |
| 5,582,669 A | 12/1996 | Gove et al. | 156/239 |
| 5,714,305 A | 2/1998 | Teng et al. | 430/271.1 |

* cited by examiner

*Primary Examiner*—James Sells

(57) ABSTRACT

One embodiment of the present invention includes a housing, a first coating module supported in the housing and a second coating module supported in the housing. The first coating module is positioned on one side of coating media path and the second coating module is positioned on the other side of the coating media path. A panel in the housing is positioned immediately opposite the outer shell of the second coating module to define a bypass media path that diverges from the coating media path and passes along the second coating module. In another embodiment, the invention includes a first web delivery system, a second web delivery system, a fuser operative along a first media path between the first and second web systems, and a second media path bypassing the fuser.

11 Claims, 6 Drawing Sheets

PRINT MEDIA COATING DEVICE WITH BYPASS MEDIA PATH

FIELD OF THE INVENTION

The invention is directed to devices for coating print media.

BACKGROUND

It is sometimes desirable to coat printed media with a film of clear flexible material. Such coatings can be formulated and applied to help protect the printed image, enhance the printed image or provide a more uniform gloss level across the entire media (including both printed and unprinted areas).

Duplex printing in which printed images are applied to both sides of a sheet of paper or other print media is now very common. Many printers, copiers, multi-function peripherals and other printing devices offer duplex printing. Where a coating is desired on both sides of a sheet, such as might be the case with duplex printing, the sheet must pass through the coating module of a post print finishing device twice—once to coat the top of the sheet and once to coat the bottom of the sheet.

The commonly assigned patent application Ser. No. 10/280,989 filed on Oct. 25, 2002 and entitled, "Print Media Coating Device and Method" describes devices and methods for simultaneously coating both sides of printed media with a flexible film. In one design, the new two-side coating device is constructed as a modular unit installed in a post print-finishing device. One such finishing device is illustrated in FIGS. 1 and 2. In this and other post print finishing devices that feature a coating capability, not all printed media sheets will be coated. It is desirable to minimize wear and tear on the coating device components by routing sheets that will not be coated around the coating device.

SUMMARY

One embodiment of the present invention includes a housing, a first coating module supported in the housing and a second coating module supported in the housing. The first coating module is positioned on one side of a first/coating media path and the second coating module is positioned on the other side of the coating media path. A panel in the housing is positioned immediately opposite the outer shell of the second coating module to define a second/bypass media path that diverges from the coating media path and passes along the second coating module.

In another embodiment, the invention includes a first coating material web delivery system, a second coating material web delivery system, a fuser operative along a first media path between the first and second web delivery systems, and a second media path bypassing the fuser.

DETAILED DESCRIPTION

Figure 1:
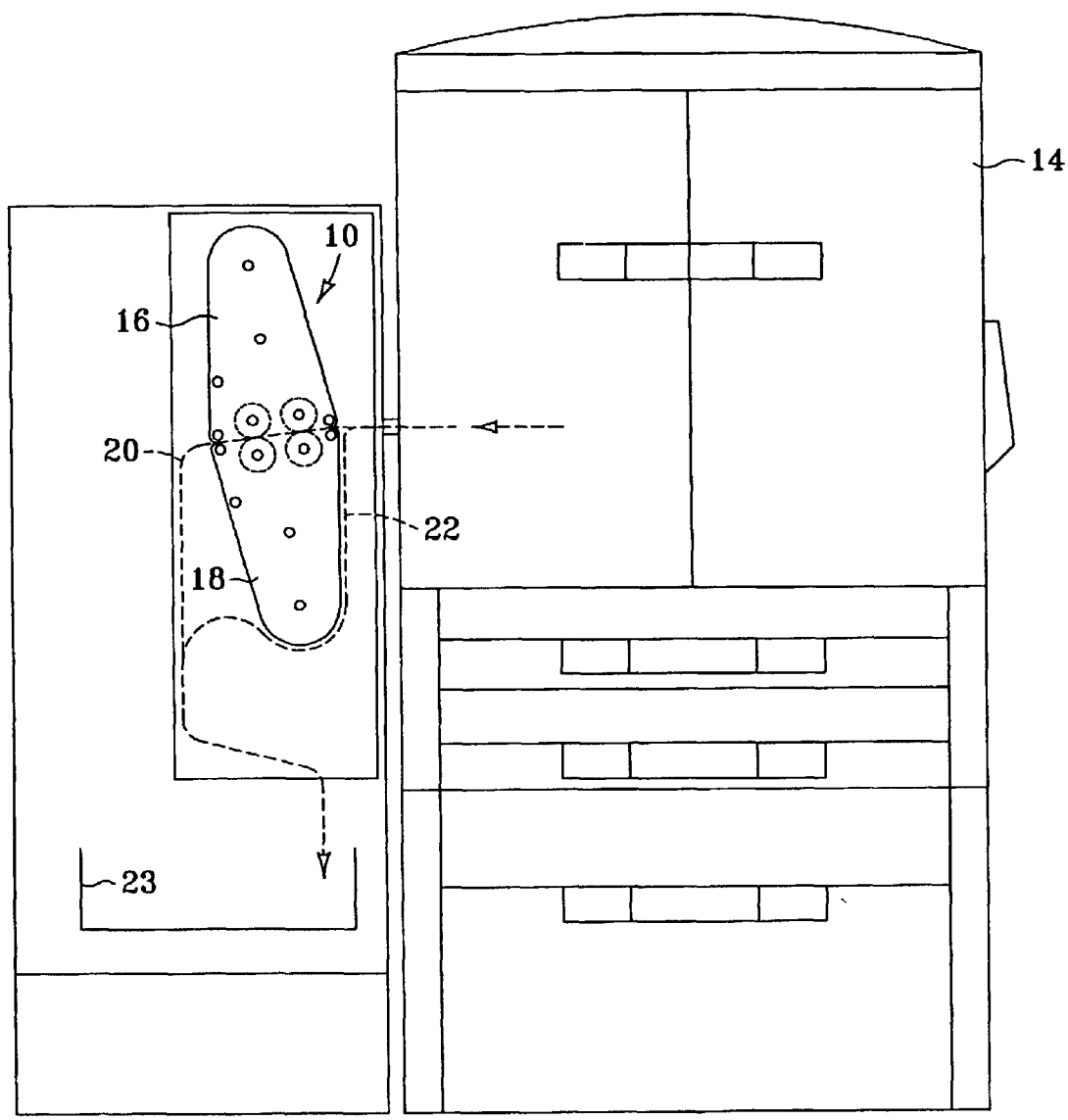
FIG. 1 illustrates coating and bypass media paths for a modular two-sided coating device installed in a post print finishing device attached to a printer, according to one embodiment of the invention.
Figure 2:
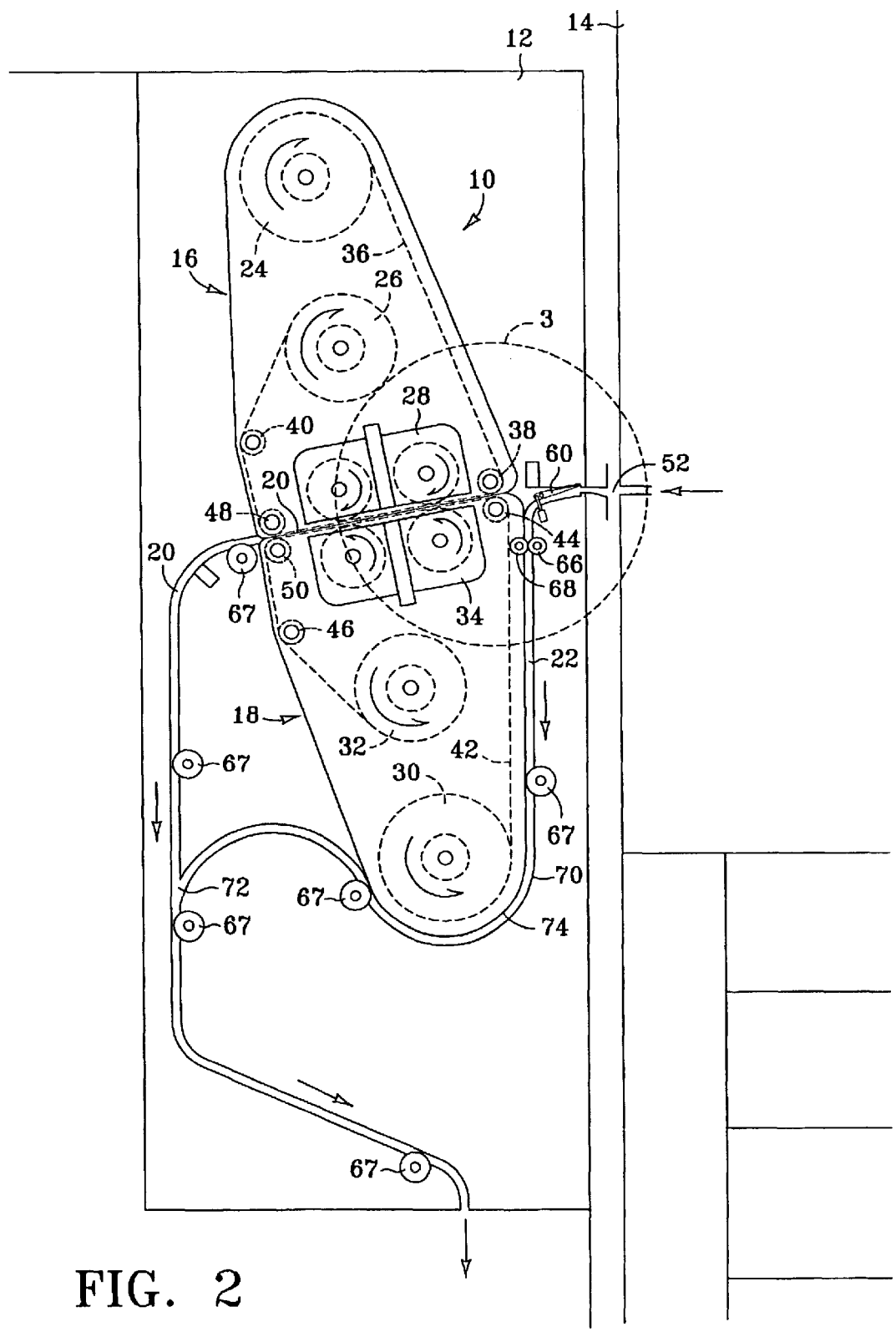
FIG. 2 is a more detailed view of a finishing device such as the one shown in FIG. 1, according to one embodiment of the invention.

FIGS. 1 and 2 illustrate a modular two side coating device 10 installed in a post print finishing device 12 operatively coupled to a printer 14. Referring to FIGS. 1 and 2, modular coating device 10 includes an upper module 16 with components for coating the top of a print media sheet and a lower module 18 with components for coating the bottom of the sheet. Two print media paths are provided through post print finishing device 12. A coating media path 20 runs through coating modules 16 and 18 and a bypass media path 22 bypasses coating modules 16 and 18. Both media paths 20 and 22 discharge media sheets to an output tray 23 or to other downstream finishing operations.

Referring specifically to FIG. 2, upper module 16 includes a first/top side coating material web supply spool 24, a first/top side web take-up spool 26, and a first/top side fuser and cooler unit 28. Lower module 18 includes a second/bottom side coating material web supply spool 30, a second/bottom side web take-up spool 32, and a second/bottom side fuser and cooler unit 34. First/top side coating material web 36 runs from top supply spool 24 through fuser and cooler unit 28 to top take-up spool 26 around idler rollers 38 and 40. Second/bottom side coating material web 42 runs from bottom web supply spool 30 through fuser and cooler unit 34 to bottom web take-up spool 32 around idler rollers 44 and 46. An exit drive roller 48 and associated pinch roller 50 propel the media sheet out of coating device 10 toward output tray 23. Other structural details and the operation of coating device 10 are described in the commonly assigned patent application Ser. No. 10/280,989 filed on Oct. 25, 2002 and entitled, "Print Media Coating Device and Method", which is incorporated by reference herein in its entirety.

Figure 3:
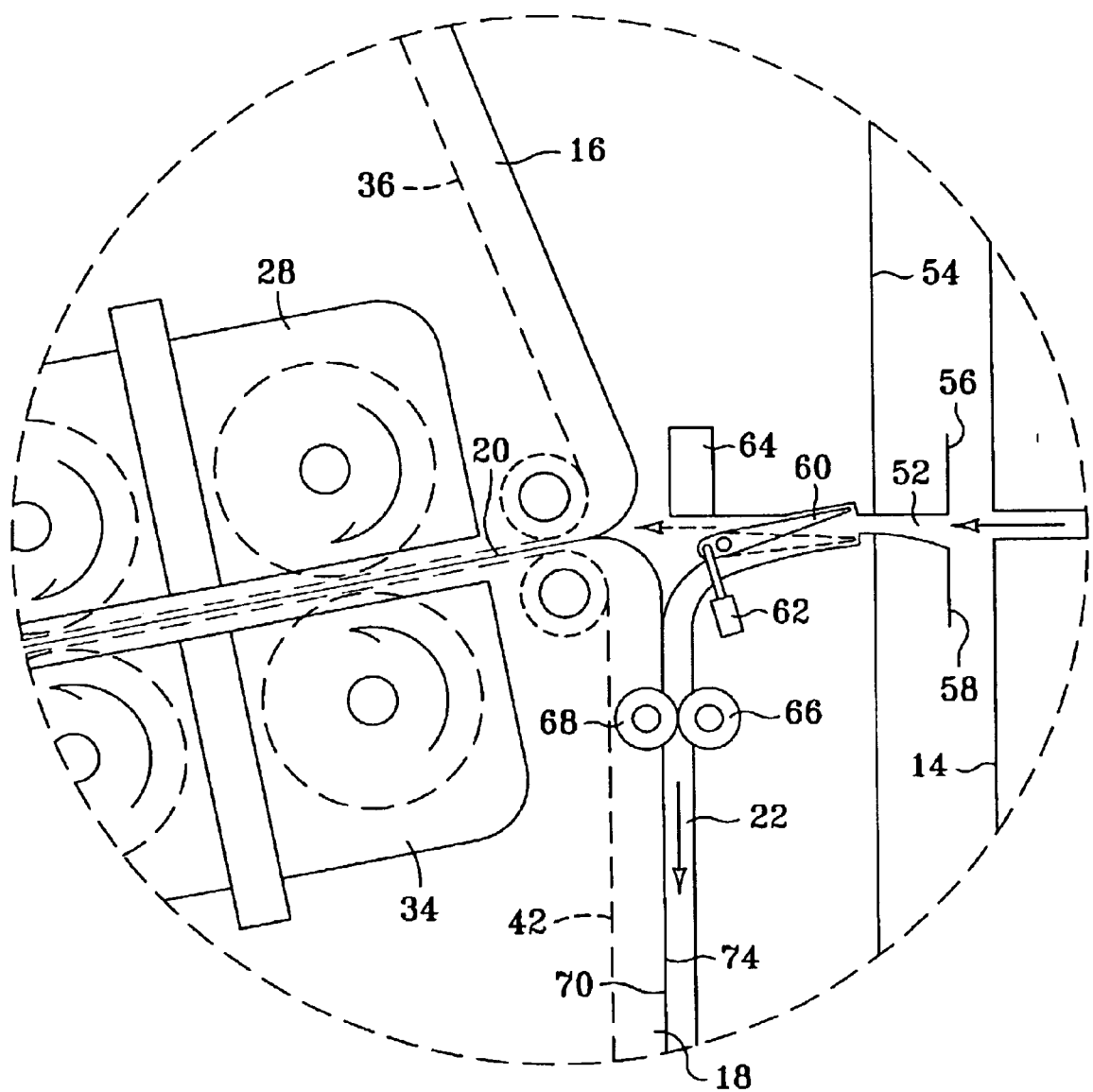
FIG. 3 is a detail elevation view of the print media sheet entry area of the finishing device of FIG. 2.
Figure 4:
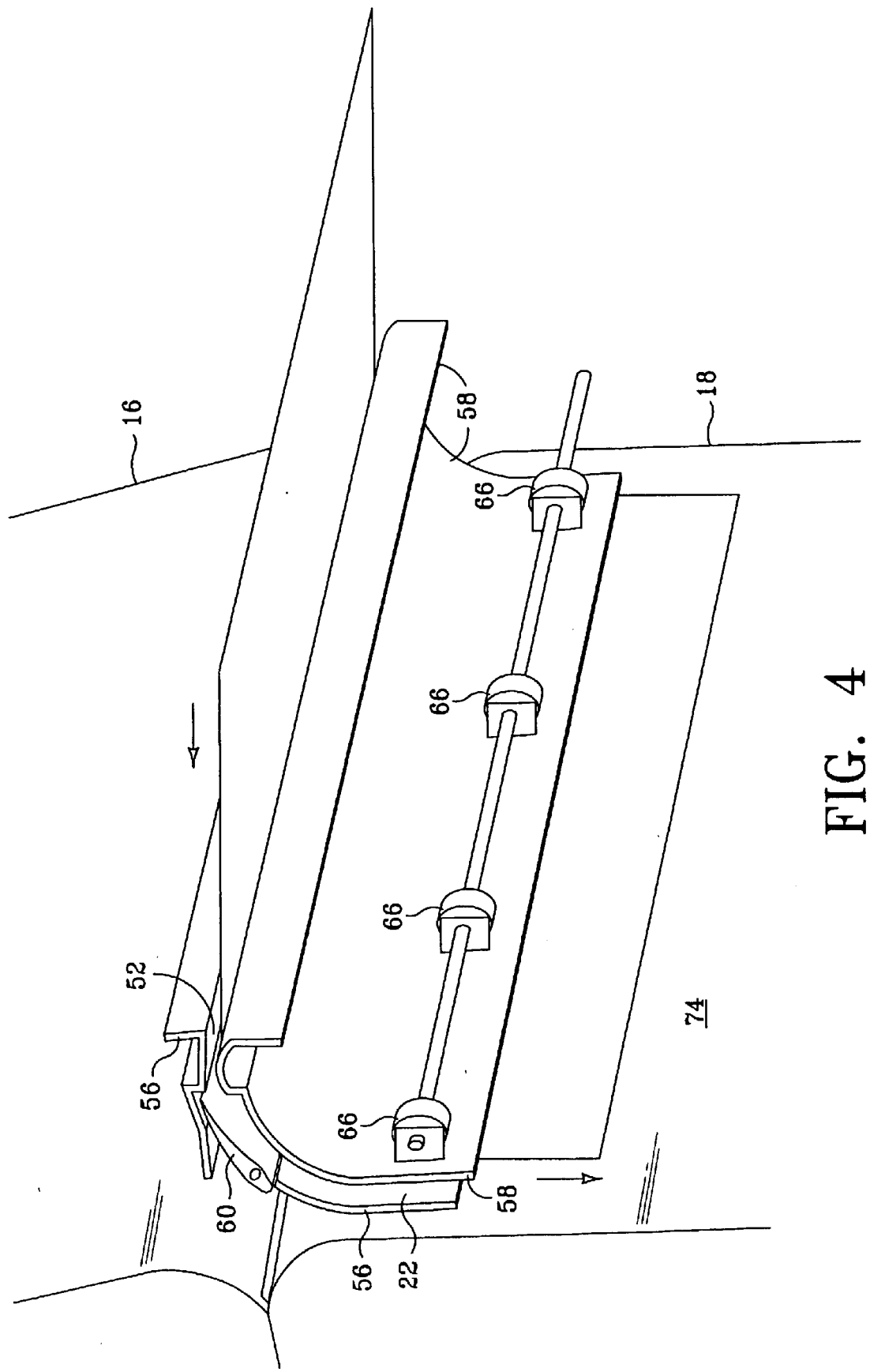
FIG. 4 is a detail perspective view of the print media sheet entry area of the finishing device of FIG. 2.

FIGS. 3 and 4 are detail views of the entry area of the finishing device 12 shown in FIG. 2. Referring now to FIGS. 3 and 4, sheets output by printer 14 enter finishing device 12 through an entry slot 52 formed in housing 54 by upper guide 56 and lower guide 58. Each guide 56 and 58 is mounted to or integral with finishing device housing 54. Entry into the desired media path is controlled by a gate 60 positioned along entry slot 52. Gate 60 is operative to move between a first position, shown by the solid lines in FIG. 3, in which media sheets are directed to bypass media path 22 and a second position, shown by the dotted lines in FIG. 3, in which sheets are directed to coating media path 20.

In the embodiment shown in FIGS. 2–4, gate 60 is configured as a tapered flipper gate that rotates, at the urging of a solenoid 62 or another suitable drive mechanism, between the first and second positions. For this configuration of gate 60, each guide 56 and 58 is, preferably, notched at the upstream tip of flipper gate 60 to present a smooth guiding surface to sheets entering finishing device 12.

Figure 6:
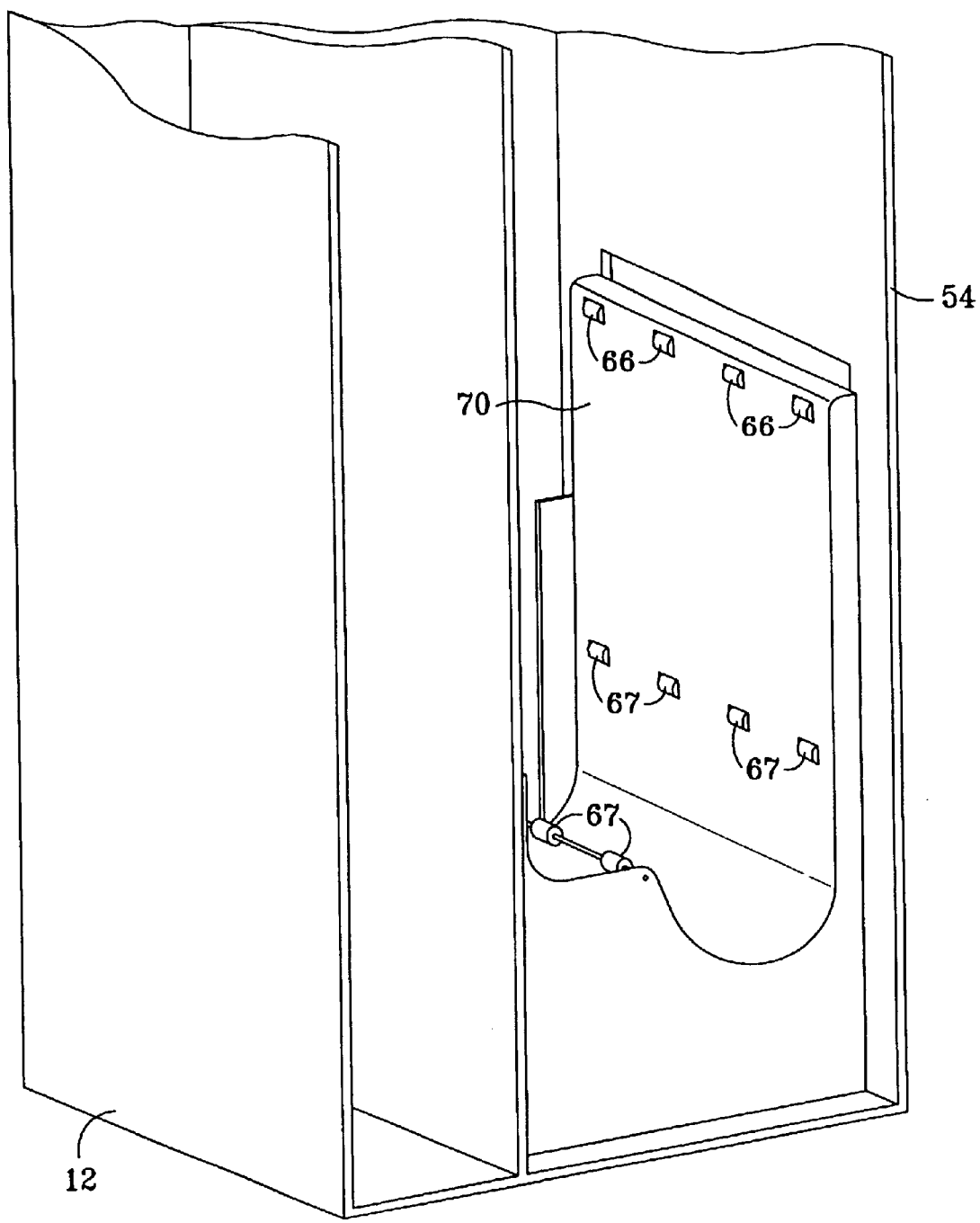
FIG. 6 illustrates the inside of a finishing device housing along the bypass media path, according to one embodiment of the invention.

The position of gate 60 typically will be controlled by the controller (not shown) for finishing device 12. If finishing device 12 does not have an on-board controller, then gate 60 will be controlled by the attached printer controller along with the other finishing device components. In either case, flipper gate 60 is rotated up or down as necessary to direct sheets to the appropriate media path. For sheets directed to coating media path 20, a media sensor 64 immediately downstream from gate 60 alerts the controller to the presence of each sheet as it enters coating device 10. Sheets directed to bypass media path 22 are guided down to a set of drive rollers. 66 that urge each sheet on down the bypass path, preferably in cooperation with a matching set of pinch rollers 68. Additional drive rollers 67 are positioned along both media paths 20 and 22 to convey media sheets along the respective paths. (Drive rollers 67 are also shown in FIG. 6.) Matching pinch rollers may also be used opposite the drive rollers 67 as necessary or desirable to move sheets along the media paths.

Figure 5:
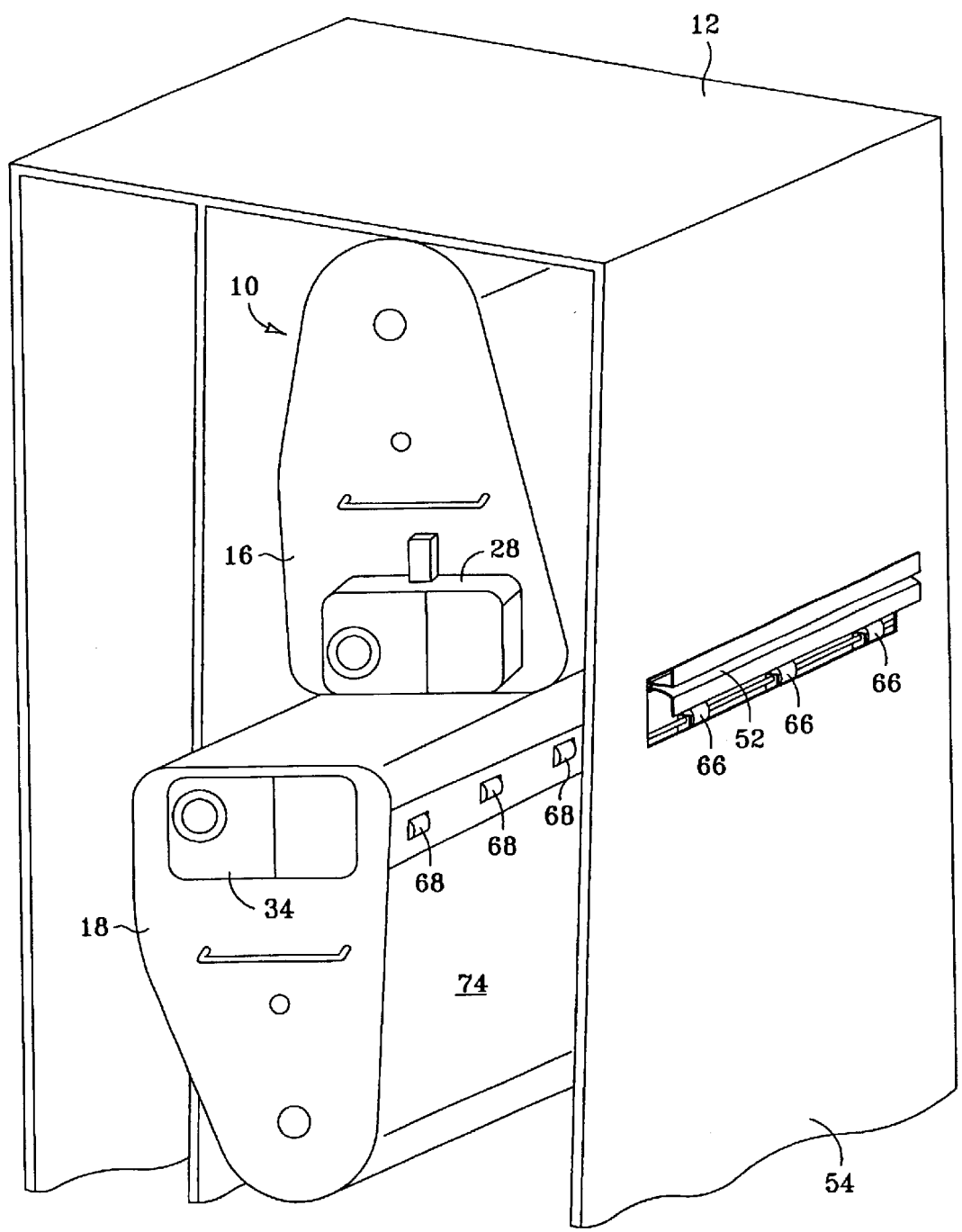
FIG. 5 illustrates the lower module of a coating device such as the one shown in FIGS. 1 and 2 partially removed from the finishing device showing the outside of the module along the bypass media path, according to one embodiment of the invention.

FIG. 5 illustrates the lower module 18 of coating device 10 partially removed from finishing device 12. FIG. 6 illustrates the inside of the finishing device housing 54 along the bypass media path 22. Referring to FIGS. 5 and 6, a panel 70 integral with or supported by finishing device housing 54 forms the outer boundary of bypass media path 22 from rollers 66 to just upstream from the confluence 72 of bypass media 22 and coating media path 20. The outer shell 74 of lower coating device module 18 forms the inner boundary of bypass media path 22 from rollers 66 to media path confluence 72. Panel 70 and outer shell 74 parallel one another along bypass path 22 to present a smooth curvilinear channel for sheets moving along the bypass path. Utilizing outer shell 74 of lower coating module 18 to form the bypass media path reduces the part count and helps reduce the size and footprint of finishing device 12. In addition, removing the lower coating device module 18 exposes bypass media path 22 making it easier to clear jams in the bypass path.

While the present invention has been shown and described with reference to the foregoing exemplary embodiments, it is to be understood that other forms, details, and embodiments may be made without departing from the spirit and scope of the invention that is defined in the following claims.

What is claimed is:

1. A print media coating device, comprising:

a housing having a panel;

a first coating module supported in the housing;

a second coating module supported in the housing, the second coating module having an outer shell;

the first coating module positioned on one side of a first media path and the second coating module positioned on another side of the first media path opposite the first coating module; and the housing panel conforming to and positioned immediately opposite the outer shell of the second coating module such that the outer shell and the panel define a second media path divergent from the first media path and passing along the second coating module.

2. The device of claim 1, wherein the second coating module is removably supported in the housing.

3. A print media coating device, comprising:

a housing;

a first coating module supported in the housing, the first coating module including a first web supply and a first web take-up;

a second coating module removably supported in the housing, the second coating module including a second web supply and a second web take-up;

a fuser defining a first media path therethrough;

the first coating module positioned on one side of the first media path and the second coating module on another side of the first media path opposite the first coating module;

a first coating material web running from the first web supply, along the first media path through the fuser, to the first web take-up;

a second coating material web running from the second web supply, along the first media path through the fuser, to the second web take-up;

the second coating module having an outer shell and the housing having a panel conforming to and positioned immediately opposite the outer shell, the outer shell and the panel defining a second media path along the second coating module and bypassing the fuser.

4. The device of claim 3, wherein the fuser includes a first part in the first coating module and a second part in the second coating module.

5. The device of claim 3, further comprising a web cooler defining a continuation of the first media path therethrough down stream from the fuser, the first and second coating material webs running from the corresponding web supply, along the media path through the fuser and the cooler, to the corresponding web take-up.

6. The device of claim 3, wherein the first media path and the second media path converge with one another at a location downstream from the fuser.

7. A print media coating device, comprising:

a housing;

a first coating module having a first rotatable web supply spool proximate a first side of a first media path and a first rotatable web take-up spool proximate the first side of the first media path downstream from the first web supply spool along a first web path that begins at the first supply spool and ends at the first take-up spool;

a second coating module having a second rotatable web supply spool proximate a second side of the first media path opposite the first side and a second rotatable web take-up spool proximate the second side of the first media path downstream from the second web supply spool along a second web path that begins at the second supply spool and ends at the second take-up spool;

a fuser along the first web path between the first supply spool and the first take-up spool and along the second web path between the second supply spool and the second take-up spool, the fuser comprising first and second rollers engagable with one another to form a fuser nip and the fuser nip defining the first media path through the fuser;

the first media path, the first web path and the second web path coincident with one another through the fuser; and the second coating module having an outer shell and the housing having a panel conforming to and positioned immediately opposite the outer shell, the outer shell and the panel defining a second media path along the second coating module and bypassing the fuser.

8. A post print finishing device, comprising:

a housing having an opening therein defining a print media entry into the housing;

a first coating module supported in the housing;

a second coating module supported in the housing;

a fuser having a first part in the first coating module and a second part in the second coating module;

a first media path extending from near the entry into the housing to and through the fuser; and a second media path extending from near the entry along the second module bypassing the fuser.

9. The device of claim 8, further comprising a gate at the entry to the housing, the gate operative between a first position in which media sheets entering the housing are directed to the first media path and a second position in which media sheets entering the housing are directed to the second media path.

10. The device of claim 9, wherein the gate comprises a flipper gate rotatable between the first position and the second position.

11. A print media coating device, comprising:

a first web delivery system;

a second web delivery system;

a first media path;

a fuser operative along the first media path between the first web delivery system and the second web delivery system; and a second media path bypassing the fuser.

* * * * *